(12) United States Patent
Matsuoka et al.

(10) Patent No.: US 7,149,915 B2
(45) Date of Patent: Dec. 12, 2006

(54) MICROCOMPUTER USING A SHARED COUNTER

(75) Inventors: Toshihiko Matsuoka, Nukata-gun (JP); Yukari Ishiguro, Hoi-gun (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 465 days.

(21) Appl. No.: 10/784,252

(22) Filed: Feb. 24, 2004

(65) Prior Publication Data
US 2004/0168098 A1    Aug. 26, 2004

(30) Foreign Application Priority Data

Feb. 25, 2003  (JP)  ............................. 2003-047472
Nov. 19, 2003  (JP)  ............................. 2003-389444

(51) Int. Cl.
*G06F 1/14*     (2006.01)
(52) U.S. Cl. ...................... 713/502; 713/320
(58) Field of Classification Search ........ 713/322–324, 713/320, 500, 502, 600
See application file for complete search history.

(56) References Cited

U.S. PATENT DOCUMENTS

| 6,385,637 | B1 * | 5/2002 | Peters et al. ................. 718/107 |
| 6,732,287 | B1 * | 5/2004 | Siorek et al. ................ 713/500 |
| 6,996,732 | B1 * | 2/2006 | Kotlow et al. .............. 713/324 |
| 2004/0122565 | A1 * | 6/2004 | Sakurai et al. .................. 701/1 |

FOREIGN PATENT DOCUMENTS

| JP | A-H09-6489 | 1/1997 |
| JP | A-2001-5695 | 1/2001 |

* cited by examiner

*Primary Examiner*—Dennis M. Butler
(74) *Attorney, Agent, or Firm*—Posz Law Group, PLC

(57) ABSTRACT

In a microcomputer, a watch-dog timer and a sleep control timer share a counter in their signal generating circuits. In a normal operation mode, an AND gate is in a signal passing state and a reset signal RST can be outputted. In a sleep mode, another AND gate is in a signal passing state and a wake-up signal WKUP can be outputted.

10 Claims, 4 Drawing Sheets

<u>RELATED ART</u>

MICROCOMPUTER USING A SHARED COUNTER

CROSS REFERENCE TO RELATED APPLICATION

This application is based on Japanese Patent Applications No. 2003-47472 filed on Feb. 25, 2003 and No. 2003-389444 filed on Nov. 19, 2003, the disclosures of which are incorporated herein by reference.

BACKGROUND OF THE INVENTION

1. Field of the Invention

The present invention relates to a microcomputer including a watch-dog timer and a sleep control timer.

2. Description of Related Art

A watch-dog timer, which supervises a CPU operated based on an operation clock generated by a main oscillation circuit, is disclosed in JP-A-2001-5695. Further, an information processing apparatus, which includes a sleep control timer for counting a time interval in order to recover a controller from a sleep mode to a normal operation mode, is disclosed in JP-A-H9-6489.

FIG. 4 shows an example of proposed configuration of a watch-dog timer and a sleep control timer. A watch-dog timer 1 is used as an abnormality detection circuit for a CPU (not shown). In the watch-dog timer 1, a counter 3 is provided for counting a sub-clock CK generated by a sub-clock oscillation circuit 2. A comparator 5 outputs a reset signal RST when a count value of the counter 3 exceeds a set value of a register 4. The CPU needs to output a clear signal CLR to the counter 3 within a predetermined supervisory time. Accordingly, no outputting of the reset signal RST means that the CPU performs a clear signal output routine without trouble.

To the contrary, while the CPU does not need to be operated, a main clock is stopped and a CPU mode changes to a low power-consumption mode (sleep mode) for reducing power consumption of a microcomputer. Once the CPU mode changes to the sleep mode, the CPU mode recovers to the normal operation mode when an interrupt signal is inputted from an external device or a predetermined sleep time passes. A sleep control timer 6 includes a counter 7 for counting the sub-clock CK. A comparator 9 outputs a wake-up signal WKUP when a count value of the counter 7 exceeds a set value of a register 8.

The watch-dog timer 1 and the sleep control timer 6 are widely used in an area of microcomputer. However, they are configured separately because their functions are quite different. Specifically, no circuit is integrated except for sharing the sub-clock CK. Recently, great efforts are made to further raise function of microcomputer. In this situation, increase of chip area causes problems such as high cost. Therefore, it is important to reduce circuit size of a microcomputer.

SUMMARY OF THE INVENTION

In view of the foregoing problems, it is an object of the present invention to provide a microcomputer which is reduced in circuit size while including both a watch-dog timer and a sleep control timer.

In order to achieve the above object, a common counter is shared by a supervisory comparing circuit for realizing a watch-dog timer and a recovery comparing circuit for realizing a sleep control timer. The watch-dog timer detects that a CPU cannot perform a clear signal output routine within a predetermined supervisory time because of CPU abnormality. Therefore, the watch-dog timer does not need to be used in a low power-consumption mode where CPU operation is stopped. To the contrary, the sleep control timer outputs a recovery command signal for recovering to a normal operation mode when a predetermined recovery time passes after the CPU changes to the low power-consumption mode. Therefore, the sleep control timer does not need to be used in the normal operation mode.

The present invention focuses on the above features of the watch-dog timer and the sleep control timer, that is, both timers do not use a common counter at the same time. Therefore, the watch-dog timer and the sleep control timer share the common counter. When the common counter is shared, a count value of the common counter is inputted to both the supervisory comparing circuit and the recovery comparing circuit for comparing. Accordingly, the supervisory comparing circuit is activated in the normal operation mode and the recovery comparing circuit is activated in the low power-consumption mode. Thus, operation of both timers is regulated, and each of an abnormality detection signal and a recovery command signal is outputted according to the operation mode.

In the present invention, circuit size can be reduced because less counters are needed compared with a conventional configuration. As a result, area of a semiconductor integrated circuit (IC) can be reduced. In addition, power consumption can also be reduced. In the present invention, the common counter is used as a time measuring circuit (timer) for measuring the supervisory time or the recovery time. Therefore, a count setting value is practically equivalent to the supervisory time or the recovery time.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

First Embodiment

Figure 1:
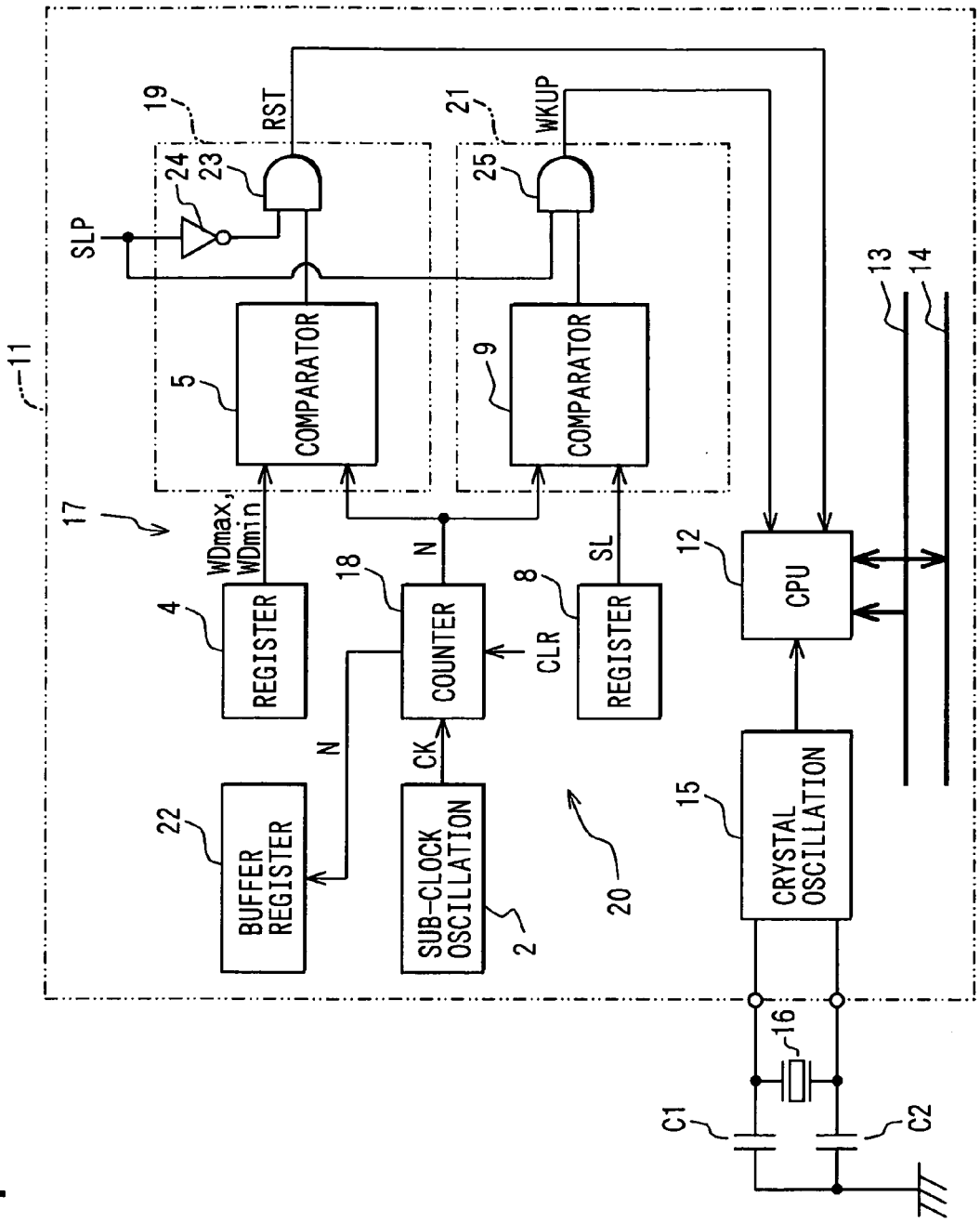
FIG. 1 is a schematic diagram showing a one-chip microcomputer according to a first embodiment of the present invention.

A one-chip microcomputer 11 in FIG. 1 is mounted on a control board of an electronic control unit (ECU) for controlling a vehicle. The microcomputer 11 is operated by being supplied with control power source voltage generated by reducing the battery voltage.

A CPU 12 is connected to various functional circuits (not shown), such as a memory, an I/O port, a timer, a counter, a communication circuit, an A/D converter and a D/A converter, through an address bus 13 and a data bus 14. The CPU 12 and the functional circuits are provided with a main clock (system clock) from a crystal oscillation circuit 15 in a normal operation mode. A crystal oscillator 16 and capacitors C1, C2 are connected to the crystal oscillation circuit 15, which is built in the IC, from the outside of the IC.

When an ignition switch (not shown) of a vehicle is OFF in situations such as parking, the microcomputer 11 can be operated in a sleep mode (low power-consumption mode) in order to reduce power consumption as much as possible. In the sleep mode, the main clock is stopped by stopping oscillation of the crystal oscillation circuit 15 and the CPU 12 stops sequential execution of a program.

However, even after the CPU 12 changes to the sleep mode, the CPU 12 needs to perform operation, such as a vehicle door-lock control based on an operation input and a refresh operation (e.g., port setting-off, state-holding operation) for preventing maloperation and early recovery from maloperation. Therefore, the CPU 12 is temporarily recovered to the normal operation mode (wake-up). This operation is performed every passing of a constant sleep time (e.g., 200 msec) or a sleep time determined according to vehicle condition, based on a count value of a sub-clock CK described later. A sleep signal SLP is a signal representing an operation mode of the microcomputer 11. The H-level of the sleep signal SLP means the sleep mode and the L-level means the normal operation mode.

The watch-dog timer 17 outputs are set signal RST (abnormality detection signal) when a clear signal CLR from the CPU 12 is not inputted over a predetermined upper limit of a supervisory time or the signal CLR is inputted at a timing earlier than a predetermined lower limit of the supervisory time. Further, the watch-dog timer 17 is composed of a register 4, a counter 18 and a signal generating circuit 19.

A sleep control timer 20 outputs a wake-up signal WKUP (recovery command signal) for directing to change to the normal operation mode when a predetermined recovery time passes after the CPU 12 changes to the sleep mode. The sleep timer 20 is composed of a register 8, a counter 18, a signal generating circuit 21 and a buffer register 22. The counter 18 and the registers 4, 8, 22 are connected to the address bus 13 and the data bus 14.

The counter 18 is a common counter which is shared by both the watch-dog timer 17 and the sleep control timer 20. The counter 18 counts up the sub-clock CK (operation clock) generated by a sub-clock oscillation circuit 2 which continues oscillation as long as the control power source voltage is supplied to the microcomputer 11. When the clear signal CLR is inputted to the counter 18, a count value N is reset to 0. The sub-clock oscillation circuit 2 includes a CR oscillation circuit which is built in the IC.

The register 4 (supervisory time register) holds count setting values WDmax, WDmin of the sub-clock CK. WDmax corresponds to the upper limit of the supervisory time and WDmin corresponds to the lower limit of the supervisory time. Further, the count setting value SL of the sub-clock CK, which corresponds to the above recovery time, is set to the register 8 (recovery time register) when a CPU mode changes from the normal operation mode to the sleep mode.

The signal generating circuit 19 for supervisory comparison includes a comparator 5 and an AND gate 23. The comparator 5 compares the count value N of the counter 18 with the count setting values WDmax, WDmin of the sub-clock CK. The AND gate 23 is for passing the output signal of the comparator 5 therethrough. The comparator 5 outputs the reset signal RST to the interrupt terminal of the CPU 12 when the count N of the counter 18 exceeds the count setting value WDmax or the count N is cleared before it reaches the count setting value WDmin. In addition, the output signal of the comparator 5 is inputted to the input terminal of the AND gate 23, and the sleep signal SLP is inputted to the other input terminal of the AND gate 23 through an inverter 24. Thus, the signal generating circuit 19 can output the reset signal RST only in the normal operation mode.

The signal generating circuit 21 for recovery comparison includes a comparator 9 and an AND gate 25. The comparator 9 compares the count N of the counter 18 with the count setting value SL of the register 8. The AND gate 25 is for passing an output signal of the comparator 9 therethrough. The comparator 9 outputs the wake-up signal WKUP when the count value N of the counter 18 exceeds the count setting value SL. The output signal of the comparator 9 is inputted to one input terminal of the AND gate 25, and the sleep signal SLP is inputted to the other input terminal of the AND gate 25. Thus, the signal generating circuit 21 can output the wake-up signal WKUP only in the sleep mode.

The count value N of the counter 18 is stored in the buffer register 22 while the microcomputer 11 is in the sleep mode. In the sleep mode, the microcomputer 11 may change to the normal operation mode because of events (e.g., external interrupt) even before the above recovery time passes. Therefore, the CPU 12 is designed to refer to the count value N stored in the buffer register 22 after wake-up so that the CPU 12 can recognize how long it has been in a sleep state.

Figure 2:
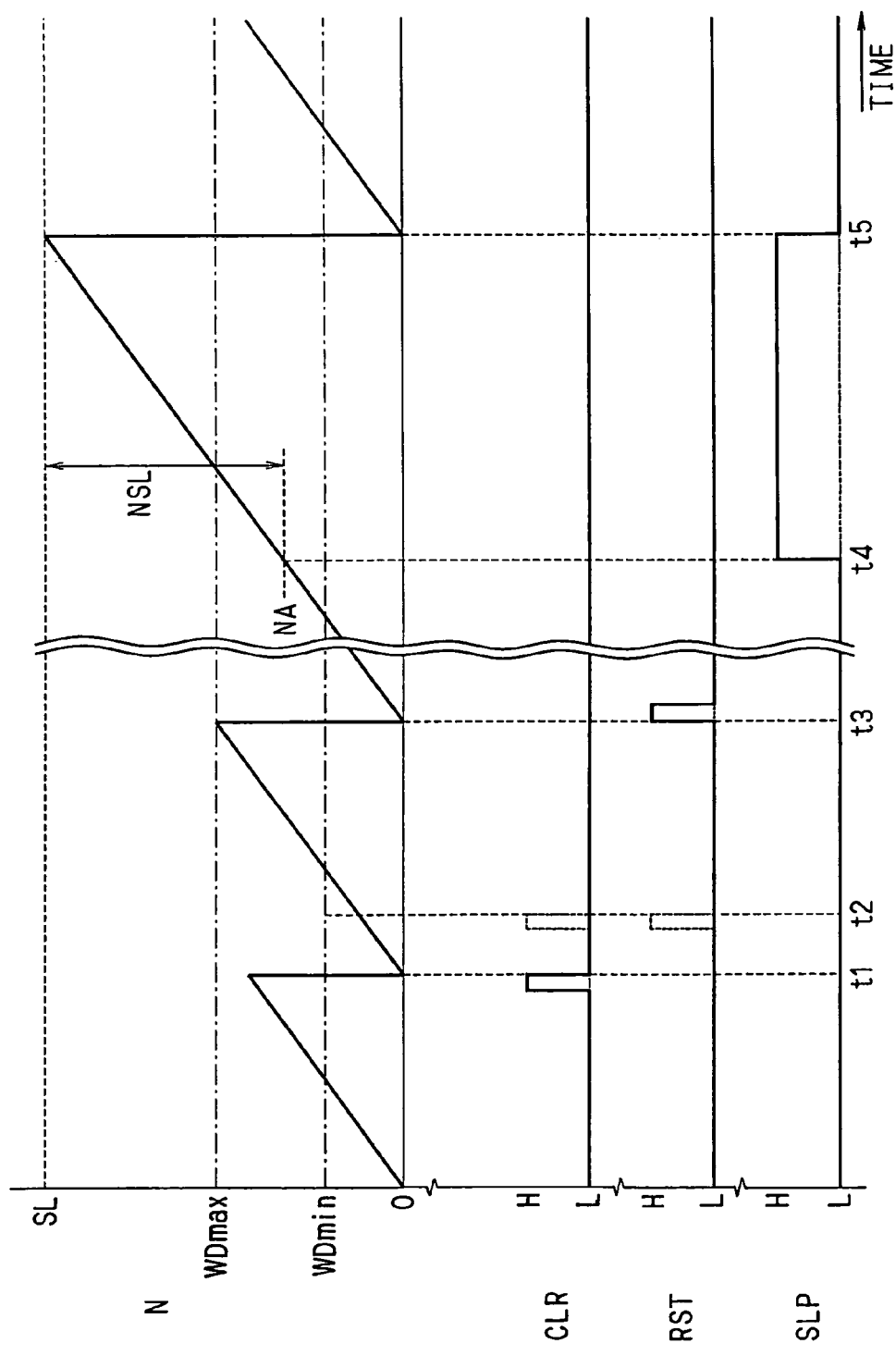
FIG. 2 is a timing chart showing a signal timing in transition between a normal operation mode and a sleep mode.

An operation of the first embodiment is shown in a timing chart in FIG. 2. FIG. 2 shows the count N of the counter 18, the clear signal CLR from the CPU 12, the reset signal RST from the signal generating circuit 19 and the sleep signal SLP.

In the normal operation mode where the sleep signal SLP is the L-level, the AND gate 23 of the signal generating circuit 19 is in a signal passing state and the AND gate 25 of the signal generating circuit 21 is in a signal blocking state. That is, the signal generating circuit 19 is activated and the signal generating circuit 21 is disabled.

When the clear signal CLR is inputted while the count value N is between the count setting values WDmin and WDmax, the signal generating circuit 19 does not output the reset signal RST at timing t1. To the contrary, when the clear signal CLR is inputted while the count value N is smaller than the count setting value WDmin, the signal generating circuit 19 outputs the reset signal RST, e.g., at timing t2. Further, the signal generating circuit 19 also outputs the reset signal RST when the clear signal CLR is not inputted and the count value N reaches the count setting value WDmax at timing t3.

To the contrary, when the sleep signal SLP turns from the L-level to the H-level and the microcomputer 11 changes from the normal operation mode to the sleep mode, the AND gate 23 of the signal generating circuit 19 becomes the signal blocking state and the AND gate 25 of the signal generating circuit 21 becomes the signal passing state. That is, the signal generating circuit 19 is disabled and the signal generating circuit 21 is activated. In the transition of the operation mode, the count setting value SL, which is the sum of a count value NA at the present time and a count value NSL corresponding to the recovery time, is set in the register 8 at timing t4. This setting can be performed by the CPU 12 before the CPU 12 changes to the sleep mode, while it can be also performed by a dedicated hardware.

After the CPU 12 changes to the sleep mode, the clear signal CLR is not inputted to the counter 18. That is, the counter 18 continues counting up without being cleared. When the count N reaches the above count setting value SL, the signal generating circuit 21 outputs the wake-up signal WKUP and the CPU 12 recovers to the normal operation mode at timing t5.

As described above, the microcomputer 11 according to the first embodiment includes the watch-dog timer 17 and the sleep control timer 20 and their signal generating circuits 19, 21 share the counter 18. The watch-dog timer 17 detects that the CPU 12 cannot perform a clear signal output routine within the predetermined supervisory time because of CPU abnormality. Therefore, the watch-dog timer 17 does not need to be used in the sleep mode where operation of the CPU 12 stops. To the contrary, the sleep control timer 20 outputs the wake-up signal WKUP for recovering to the normal operation mode when the recovery time passes after the CPU 12 changes to the sleep mode. Therefore, the sleep control timer 20 does not need to be used in the normal operation mode.

The first embodiment focuses on the above features of the watch-dog timer 17 and the sleep control timer 20, that is, a point that both timers do not use the common counter 18 at the same time. Specifically, the number of counters, which are provided in each timer, is reduced in the microcomputer 11. Therefore, circuit size of the microcomputer 11 can be reduced, and chip area and cost can be also reduced. In addition, power consumption of the microcomputer 11 can also be reduced.

In this case, the signal generating circuits 19, 21 operate complementarily to each other by using the AND gates 23, 25 to which the sleep signal SLP is inputted as a gate signal. Therefore, one of the signal generating circuits 19, 21 does not output an erroneous signal even when the counter 18 is operated by the other of the circuits 19, 21. In addition, the CPU 12 can recognize how long it has been in the sleep state even after wake-up caused by events such as external interrupt, because the buffer register 22 is provided.

In the operation of the CPU 12, it is desirable to enhance functions, such as supervision and early detection of maloperation, recovery to the normal operation and prevention (fail-safe) of spread of maloperation. In order to achieve this, it is effective that the CPU 12 is recovered to the normal operation mode intermittently by using the sleep control timer 20 and the CPU 12 refreshes the internal state of the microcomputer 11. In addition, it is effective to operate the watch-dog timer 17 even when the main clock stops because of, for example, poor connection of the capacitors C1, C2 and the crystal oscillator 16.

If the watch-dog timer 17 is operated by using the main clock, maloperation caused by the main clock stop cannot be detected although program abnormality can be detected. In the first embodiment, the sub-clock CK, which is generated from a separated system from the main clock for operating the CPU 12, is inputted to the common counter 18 shared by the watch-dog timer 17 and the sleep control timer 20. Therefore, the above fail-safe function can be further enhanced.

In addition, the CPU 12 resets the watch-dog timer 17 at regular intervals. Therefore, the CPU 12 can be recovered to the normal operation if the main clock is generated again even when the main clock stops temporarily in the normal operation mode. Further, the microcomputer 11 holds a reset state even when the main clock continues stopping in the normal operation mode. That is, terminals of the microcomputer 11 are in a certain initial state (e.g., input state). Therefore, the microcomputer 11 does not output an erroneous signal to external devices connected to it.

In many cases, high accuracy is required in oscillation period of the main clock. Accordingly, the crystal oscillator 16 is used in the first embodiment. However, in many cases, this kind of oscillator is mounted outside the IC and the capacitors C1, C2 are also required. These elements mounted outside the IC reduce reliability on the main clock because they may come off from the IC or have trouble. To the contrary, a built-in CR oscillation circuit is used as the sub-clock oscillation circuit 2 in the first embodiment. Therefore, reliability on the oscillating operation of the sub-clock CK can be increased because no element does not need to be mounted outside the IC.

Second Embodiment

Figure 3:
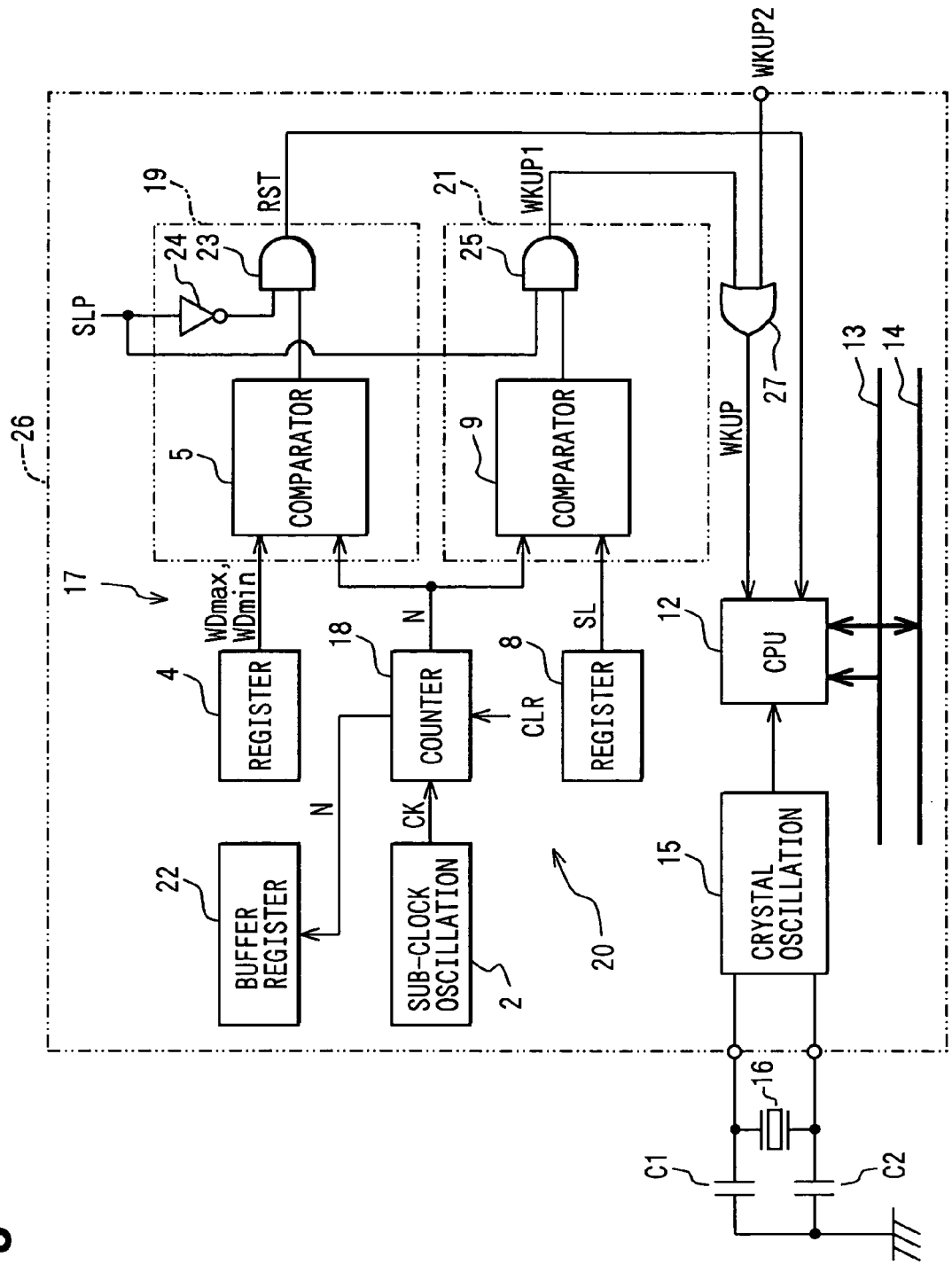
FIG. 3 is a schematic diagram showing a one-chip microcomputer according to a second embodiment of the present invention.
Figure 4:
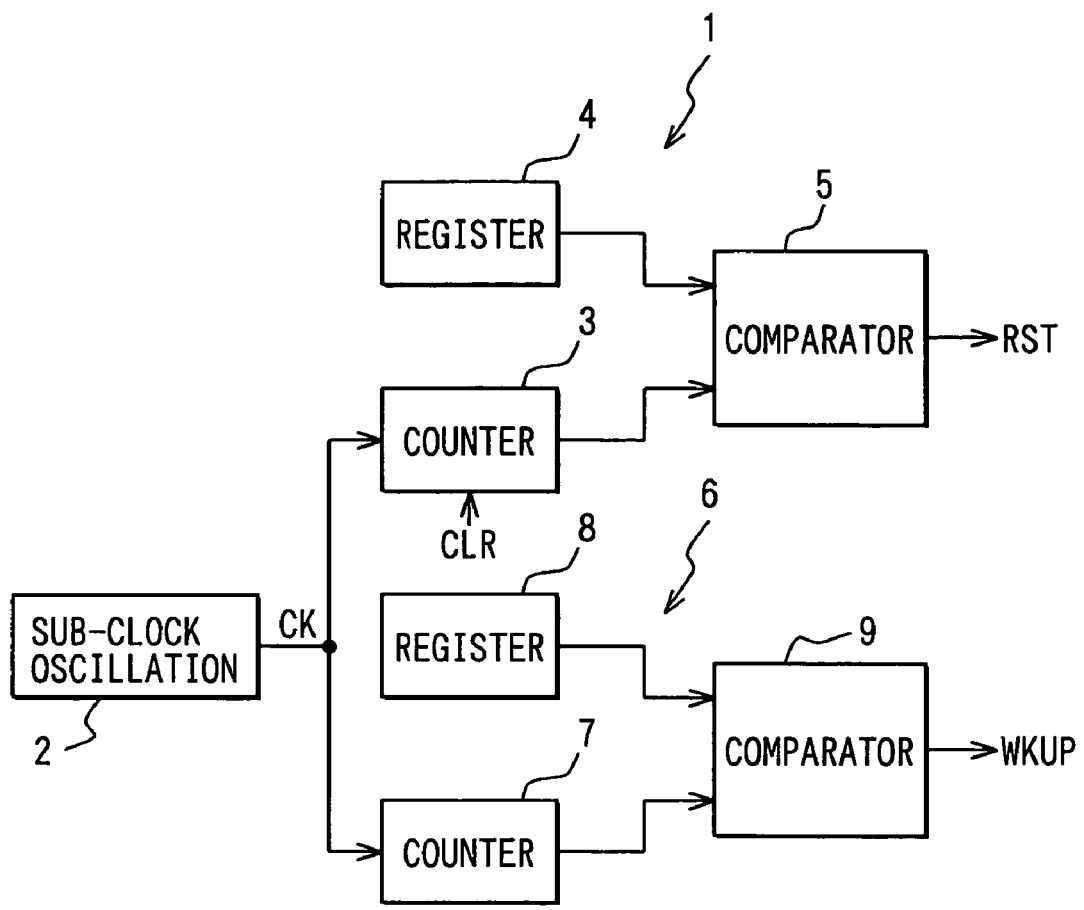
FIG. 4 is a block diagram showing a watch-dog timer and a sleep control timer according to the related art.

In the second embodiment, a microcomputer 26 is constructed as shown in FIG. 3 by adding an OR gate 27 to the microcomputer 11 in FIG. 1. A wake-up signal WKUP1 from the AND gate 25 and a wake-up signal WKUP2 (recovery command signal) from the outside of the IC are inputted to the OR gate 27. Then, the OR gate 27 outputs a wake-up signal WKUP to the interrupt terminal of the CPU 12. The wake-up signal WKUP2 inputted from the outside of the IC is, for example, a communication start signal, which represents start of LAN communication in a vehicle, or an operation input signal, which represents existence of various operation inputs.

According to the second embodiment, the same operation and effect as those of the first embodiment can be obtained. Furthermore, the CPU 12 can be also recovered from the sleep mode to the normal operation mode by the wake-up signal WKUP2 from the outside of the microcomputer 26.

OTHER EMBODIMENTS

Although the present invention has been fully described in connection with the preferred embodiments thereof with reference to the accompanying drawings, it is to be noted that various changes and modifications will become apparent to those skilled in the art.

For example, the counter 18 can be cleared once when the microcomputer 11 changes from the normal operation mode to the sleep mode. Then, the count value NSL, corresponding to the recovery time, can be set to the register 8 as the count setting value SL.

Further, the watch-dog timer 17 can be designed to output the reset signal RST only when the count N of the counter 18 exceeds the count setting value WDmax.

Further, in the signal generating circuits 19, 21, the AND gates 23, 25 can be provided between the counter 18 and the comparators 5, 9 respectively.

The buffer register 22 can be omitted if it is not necessary. A ceramic oscillator can be also used instead of the crystal oscillator 16. A ring oscillation circuit can be used as the sub-clock oscillation circuit 2.

What is claimed is:

1. A microcomputer comprising:
 a CPU;
 a watch-dog timer for outputting an abnormality detection signal when a clear signal input from the CPU stops over a predetermined supervisory time;
 a sleep control timer for outputting a recovery command signal for recovering the CPU to a normal operation mode when a predetermined recovery time passes after the CPU changes to a low power-consumption mode;

a common counter for counting an operation clock inputted in both the low power-consumption mode and the normal operation mode, a count value of the common counter being cleared based on the clear signal input;

a supervisory time register for holding a count setting value of the operation clock according to the predetermined supervisory time;

a recovery time register for holding a count setting value of the operation clock according to the predetermined recovery time;

a supervisory comparing means which is activated in the normal operation mode and outputs the abnormality detection signal based on a result of comparison between the count value of the common counter and the count setting value of the supervisory time register; and a recovery comparing means which is activated in the low power-consumption mode and outputs the recovery command signal based on a result of comparison between the count value of the common counter and the count setting value of the recovery time register.

2. The microcomputer according to claim 1, wherein:

the supervisory comparing means includes a supervisory comparator for comparing the count value of the common counter and the count setting value of the supervisory time register, and a supervisory gate means for passing an output signal of the supervisory comparator therethrough in the normal operation mode; and the recovery comparing means includes a recovery comparator for comparing the count value of the common counter and the count setting value of the recovery time register, and a recovery gate means for passing an output signal of the recovery comparator therethrough in the low power-consumption mode.

3. The microcomputer according to claim 1, wherein:

the supervisory comparing means includes a supervisory gate means for passing the count value of the common counter therethrough in the normal operation mode, and a supervisory comparator for comparing an output value of the supervisory gate means and the count setting value of the supervisory time register; and the recovery comparing means includes a recovery gate means for passing the count value of the common counter therethrough in the low power-consumption mode, and a recovery comparator for comparing the output value of the recovery gate means and the count setting value of the recovery time register.

4. The microcomputer according to claim 1, wherein the recovery time register holds a count setting value which is a sum of the count value of the common counter when a CPU mode changes from the normal operation mode to the low power-consumption mode and the count value of the operation clock corresponding to the predetermined recovery time.

5. The microcomputer according to claim 1, wherein the common counter is cleared when a CPU mode changes from the normal operation mode to the low power-consumption mode and the recovery time register holds the count value of the operation clock corresponding to the predetermined recovery time.

6. The microcomputer according to claim 1, wherein the recovery command signal for recovering from the low power-consumption mode to the normal operation mode is outputted when a predetermined recovery condition occurs in addition to passing of the recovery time.

7. The microcomputer according to claim 6, wherein the predetermined recovery condition is an input of the recovery command signal from the outside of the microcomputer.

8. The microcomputer according to claim 1, wherein a buffer register is provided for storing the count value of the common counter at a moment when the recovery command signal is outputted.

9. The microcomputer according to claim 1, wherein the operation clock inputted to the common counter is a sub-clock which is generated from a separated system from a main clock operating the CPU.

10. The microcomputer according to claim 9, wherein:

the microcomputer is configured in an IC; and the sub-clock is generated by a CR oscillation circuit built in the IC.

* * * * *